Sept. 10, 1963                    W. JUDA                    3,103,473
METHOD FOR THE ELECTROCHEMICAL REDUCTION OF COMPOUNDS
Filed Feb. 5, 1960
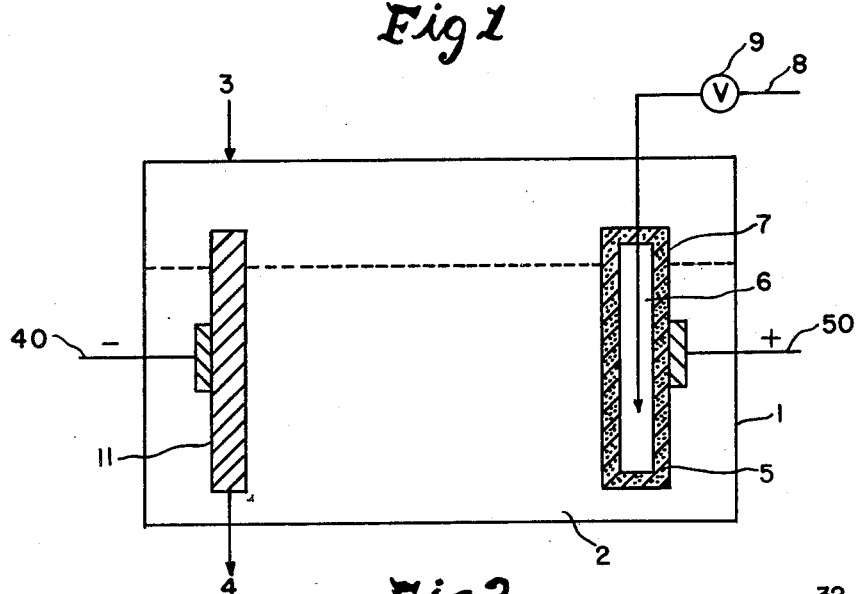
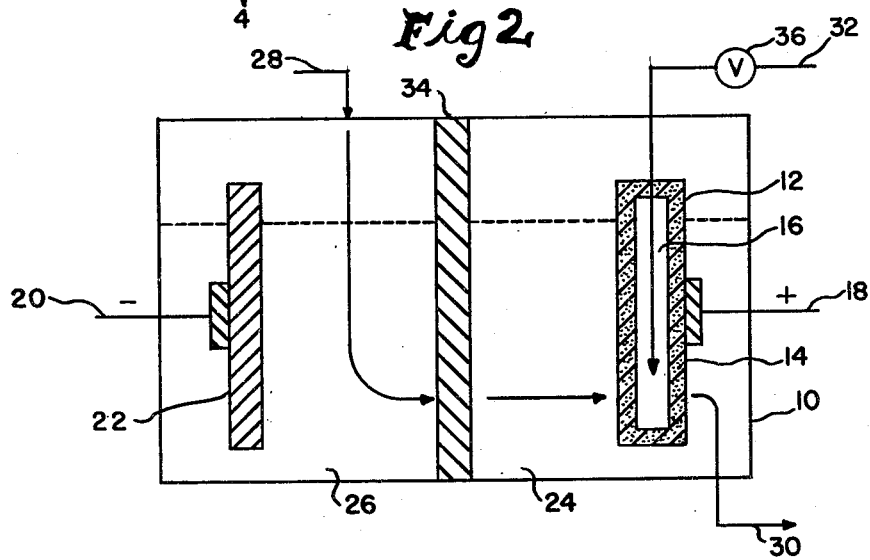
Inventor:
Walter Juda
by: *Aaron Tushin*
Attorney United States Patent Office 3,103,473
Patented Sept. 10, 1963

3,103,473
METHOD FOR THE ELECTROCHEMICAL REDUCTION OF COMPOUNDS
Walter Juda, Lexington, Mass., assignor to Ionics, Incorporated, Cambridge, Mass., a corporation of Massachusetts
Filed Feb. 5, 1960, Ser. No. 7,046
7 Claims. (Cl. 204—77)

This invention relates to the electrochemical reductions of organic and inorganic compounds by means of D.C. energy produced at least in part by direct conversion of fuels in a cell. More particularly, the invention is concerned with electrochemical reductions of organic and inorganic materials in an electrolytic cell which contains an electrolyte solution, a porous fuel-fed anode, which may include a catalyst for the electrochemical reaction effected at the surface thereof, and a conventional cathode, with auxiliary means for passing a D.C. current through said cell as found necessary.

So-called "fuel cells" are well known in which electrical energy (D.C.) is produced from the chemical energy of oxidant and combustible gases introduced through appropriate porous electrodes. In the typical fuel cell, hydrogen gas, or other combustible gas, is introduced into a cell through a porous electrode made, for example, of a noble metal, or of porous carbon or graphite containing a noble metal catalyst, or the like; and oxygen, or an oxygen-containing gas, is introduced through a porous electrode containing preferably an active metal or metal oxide catalyst; the two electrodes being electrolytically connected through either an aqueous electrolyte solution or a solid electrolyte, e.g., an ion exchange membrane. In these cells, low voltage D.C. energy is produced directly from the reaction of hydrogen and oxygen at conversion efficiencies considerably in excess of the usual conversion of chemical energy-to-heat to mechanical energy-to-electric energy.

Electrochemical oxidations and reductions have also been carried out at porous electrodes in the past; in these oxido-reductions porous graphite was preferably used and the aqueous electrolyte solutions were introduced or removed through the porous electrodes.

The electrolytic reduction of many organic and inorganic compounds, insoluble as well as soluble, in the usual electrolytes is well known. Such reductions have been carried out with porous and non-porous cathodes.

Electrolytic cells comprising fuel electrodes which are especially adapted for electrochemical conversions in which it is important to obtain certain products from an electrolyte solution are disclosed in applicant's U.S. patent application Serial No. 842,892, filed on September 28, 1959, and patent application, Serial No. 3,418, filed January 19, 1960.

It is an object of the present invention to provide a process involving the use of fuel anodes to effect an electrochemical reduction of an organic or inorganic material associated with a conventional type cathode which reduction requires energy input. It is a further object to effect such an electrochemical reduction with less energy requirement and accordingly more economically than heretofore possible. It is a further object to effect electrochemical reduction of materials without the usual oxidation effects at the anode of an electrolytic cell. A further object of this invention is the chemical reduction of compounds without the necessity of the removal of the reducing agent contaminant of the product obtained by chemical reduction.

An additional object of the present invention is to effect electrochemical reduction of organic and inorganic materials which overcome many of the disadvantages attending prior known methods. Further objects will become apparent from the following detailed disclosure.

In general, the present invention is directed to the electrochemical reduction at a permanent cathode of organic and inorganic materials, and especially those materials which require energy input to effect the reduction. According to this invention, a fuel is passed through a porous "fuel" anode in an electrolytic cell containing an electrolyte solution, and the material to be reduced is introduced into the cell containing a known permanent cathode, for example in the vicinity of a non-porous cathode or through a porous cathode. The fuel at the interface of the anode and the electrolyte reacts to form ions. In this manner, the cathodic reduction of the organic or inorganic compound is effected with savings of energy as will be more fully disclosed hereinafter.

The process and equipment of this invention utilizes an electrochemical reduction cell with a permanent cathode defining at least one solution compartment and a porous anode, preferably containing an active catalyst for the reaction taking place at the interface of said anode between a fuel and the electrolyte solution. The cell of this invention, in its simplest form, comprises a fuel anode and a cathode, the latter being the conventional cathode, which may be porous, for introducing or removing the feed or product material.

The present invention is especially directed towards electrochemical reductions with a "permanent" cathode. For the purpose of this specification and the appended claims, a permanent cathode is defined as a cathode which is not the product of the electrochemical reduction. In this cell, the fuel anode replaces the conventional insoluble or "permanent" anode at which, for example, oxygen was usually evolved.

In one cell construction, according to this invention, a fuel anode is employed. The anode is a conductor which is sufficiently porous to adsorb and allow the fuel, usually but not necessarily in the presence of a catalyst, to react with the electrolyte at the surface of said electrode to produce H+ ion or other appropriate positive ion, directly or indirectly, with release of electric energy.

Substantial savings in energy consumption of the electrolytic process are secured when a fuel catalytic anode, and especially a gas catalytic anode, is integrated with electrochemical reduction cells. In such a cell, the necessity of supplying energy for the discharge of a gaseous product at the anode is eliminated. Furthermore, by choosing a fuel anode with an appropriate catalyst, the conversion of the fuel to the hydrogen ions, or other similar acting ions, is accelerated. Comparing a conversion cell comprising fuel catalytic anodes with a conventional conversion cell powered by a separate fuel cell, (1) a significant energy saving is obtained in the former due to the elimination of the ohmic loss of the separate fuel cell, and (2) a significant investment saving is obtained by eliminating the separate fuel cell altogether.

The saving in total energy consumption obtained by eliminating the energy required to discharge gaseous products at the electrodes is especially significant where the voltage drop across the electrolyte solution is relatively small, of the order of a few volts. Gaseous discharge potentials, including overvoltages, often account for more than one-half of the total potential in electrolysis with insoluble (permanent) anodes.

In the electrochemical reduction cells with permanent anodes, oxidizable solutes are often oxidized at the anode in place of the usual oxygen evolution. An example is the electrochemical reduction of a nitrate to nitrite, carried out in an alkaline solution in which oxygen is usually produced at the anode. In addition, many nitro compounds have been reduced electrochemically. Nitrobenzene has been reduced to p-aminophenol or to nitrosobenzene, thence to phenyl hydroxyl amine, finally to aniline. In contrast to chemical methods, electrolytic reduction may be a stepwise procedure controlled by variations of temperature, potentials, electrode composition, concentration of reactants, etc. Many studies are described in the literature showing how the organic reductions can be controlled by an appropriate choice of cathodes and operating conditions, as note, for example, "Organic Electrode Processes," by Milton J. Allen, Reinhold Publishing Corporation, New York, 1958, chapters 3, 4 and 5, entitled, respectively, "Cathodic Reduction," "Cathodic Reduction of Carbonyl-Type Compounds," and "Miscellaneous Cathodic Reactions." The anode voltage, which includes the oxygen discharge voltage as well as the oxygen overvoltage, represents a large fraction of the total electric energy required in the cell. Similarly, if an oxidizable acid, for example, an organic acid such as acetic acid or lignin sulfonic acid is used, these organic acids are oxidized. However, in the present invention, by the use of a hydrogen ion-producing or hydrogen-containing fuel anode, or other appropriate materials, such as $SO_2$, $H_2S$, acetylene, etc., such oxidations are minimized or eliminated and result in a much wider variety of electrolytes suitable for electrochemical reduction processes.

The electrochemical reaction at the anode where hydrogen gas or hydrogen-containing gases or other appropriate gases are employed often necessitates the use of a catalyst for the reaction. Suitable catalysts include metals of group VIII of the periodic table, such as rhodium, platinum, palladium, and iridium. Other catalysts may constitute the electrodes themselves or they may be impregnated or deposited on porous structures including porous carbon, graphite, porous nickel, and the like. In this respect, reference is made to the many fuel electrodes described in the literature as part of the fuel cells, including, for example, British Patent 794,471 of 1958, U.S. Patent 2,860,175, U.S. Patent 2,384,463 and German Patent 904,200 (1954) and the literature quoted therein, many of which are suitable for use according to the present invention.

It is often found necessary to protect a porous fuel catalytic electrode against the capillary sorption of the electrolyte solution by means of a treatment which renders the fuel electrode repellent to the electrolyte solution without closing the pores. Such treatments are known to include, for example, the coating of the fuel electrode with a thin film of paraffin or rubber or the like, without impeding flow through the electrode.

Fuels suitable for this invention include especially hydrogen gas, carbon monoxide, and hydrogen-containing gases, such as water gas (produced by reacting water with coal), reformed natural gas (produced by reacting water with natural gas or other hydrocarbon), partially oxidized natural gas which gives a mixture which is largely hydrogen and carbon monoxide; also producer gas, sulfur dioxide, hydrogen sulfide, and the like. In addition, gaseous hydrocarbons, such as methane, ethane, coal gas, gasified gasoline, natural gas, etc., can also be used with an appropriate catalyst. In general, the fuels suitable in electrochemical reduction cells of this invention are fuels which will produce at the anode, by electrochemical conversion, hydrogen ions without accumulation of a deleterious anion in solution. In addition, liquid fuels, for example, liquid hydrocarbons (with appropriate catalysts), methanol, ethanol, and the like, may also be used.

Typical for a primary conversion at the anode is, of course, hydrogen gas which produces hydrogen ion according to the reaction: $H_2 \rightarrow 2H^+ + 2e$. Carbon monoxide at the anode also results in the same production of hydrogen ion in the acid or neutral media of this invention according to the reaction:

$$CO + H_2O \rightarrow 2H^+ + CO_2 + 2e$$

The use of fuel-catalytic anodes is of special value when the electrolytic process is carried out in such a manner that energy requirement consists of relatively low D.C. voltage input with attendant relatively high current density. Clearly, their application is further enhanced when the source of hydrogen ion-producing gas is readily available at low cost.

According to this invention, a fuel electrode, and preferably a fuel-catalytic electrode, is used as the anode and is supplied with fuel, and in this manner, D.C. voltage is produced, rather than consumed, as is the case at the conventional anode.

In some cases, in order to obtain high current efficiency in accordance with the present invention, it has been found desirable and sometimes necessary to employ porous separating diaphragms, such as asbestos diaphragms, etc., in the cell between the spaced electrodes. Generally, if the ion produced at the anode, for example, hydrogen, interferes with the reduction, for instance by $H^+$ ion discharge at the cathode, it is desirable to flow the electrolyte from the cathode compartment through a porous diaphragm into the anode compartment and out from there to oppose the movement of the interfering ion, e.g., $H^+$ ion, from anode to cathode. With the use of a fuel anode, it is now possible to flow a catholyte solution containing the reduction product through the diaphragm into the anode compartment without danger of significant re-oxidation.

In order to better illustrate the invention of the present case, reference is made to the drawing wherein:

The drawing is a diagrammatic representation of an electrochemical reduction cell having a solution compartment, an anodic assembly including the fuel well and porous fuel-catalytic anode, and a conventional cathode with provisions for passing a material for chemical reduction in proximity or contact with said cathode.

The invention may be better understood by reference to the following detailed description taken in connection with the drawing which is a diagrammatic illustration of the chemical conversion cells and their operation in the electrochemical reduction of materials within the scope of the present invention.

The cell 1 of the drawing comprises a porous fuel catalytic anode electrode made up of the porous conductor 7 containing a catalyst 5 at its interface in contact with electrolyte 2. The porous anode is provided with means 8 for passing a hydrogen ion-producing fuel into said porous electrode as at well 6. Control of the rate of flow of the fuel into the anode is provided by valve 9. Spaced from the anode is a conventional or porous cathode 11. A source of D.C. electric current (not shown) contacts the electrodes at 40—50 to be used when found necessary. Means are provided for influent and effluent of the electrolyte solution as at 3 and 4, respectively. It is also contemplated that the material to be reduced may be passed into the cell chamber in proximity to the cathode and the reduced material removed from the cell through the porous cathode.

The operation of the described cell may be illustrated as follows:

In the electrochemical reduction of p-nitraniline to p-phenylenediamine, the cathode 11 is made of porous graphite, the anode is a porous catalytic fuel electrode 7 into and through which hydrogen gas is passed, the electrolyte in cell 2 is an acid such as hydrochloric acid with the p-nitraniline dissolved therein, and the p-phenylenediamine may be removed through the porous graphite cathode as at 4. The hydrogen gas reacts at the surface and pores of anode 7, which reaction is activated by a suitable catalyst 5 to form H ions which migrates toward the cathode 11 where hydrogen-produced gas reduces the p-nitraniline to p-phenylenediamine, the latter passing out of the cell through the porous cathode 11 as at 4 for purification. The reaction of the hydrogen gas to hydrogen ions at the anode interface with the electrolyte in contact therewith produces a potential which is sufficient or at least minimizes the necessary potential required by an outside source of potential to effect the desired chemical reduction at the cathode.

The cell 10 of FIG. 2 comprises anode and cathode compartments 24 and 26, respectively, defined by a porous diaphragm 34 such as asbestos. The porous fuel anode assembly 12 is the same as that of FIG. 1, wherein the inlet pipe 32, having valve 36 therein, provides anode 12 with the fuel as at 16, contacting the anolyte and reacting therewith by virtue of the presence of the catalyst 14. The cathode 22 is of a conventional permanent type. Cathode chamber 26 is provided with inlet means 28 for passing an electrolyte into said chamber, and the anode chamber is provided with outlet means 30 for the reacted electrolyte which passes through the asbestos diaphragm 34 into said anode chamber. A D.C. potential for the cell is provided through means 18—20 from an outside source (not shown).

To demonstrate the energy advantage to be gained from the use of fuel electrodes in common electrochemical operations which are carried out, for example, in sulfuric acid media, a simple electrolytic cell was constructed in accordance with the drawing in which sulfuric acid of specific gravity of 1.225 was used as the electrolyte with a conventional graphite cathode. In the first series of tests indicated as "conventional electrolysis" in the following table, a conventional graphite anode was used. In a second series of tests, the conventional graphite anode was replaced with a hydrogen porous catalytic (platinum) fuel anode. The tests were run at two different temperatures and different current densities covering the usual range in such an operation. The following results were obtained:

TABLE

*Hydrogen Anode in Acid*

| Temp., °C. | Current Density, ma./cm.$^2$ | Electrolyte | Conventional Electrolysis, Volts | Hydrogen Anode, Volts |
|---|---|---|---|---|
| 30 | 10 | $H_2SO_4$ 1.225 sp. g. | 2.2 | 0.8 |
| 30 | 100 | $H_2SO_4$ 1.225 sp. g. | 2.9 | 1.4 |
| 60 | 10 | $H_2SO_4$ 1.225 sp. g. | 1.8 | 0.5 |
| 60 | 100 | $H_2SO_4$ 1.225 sp. g. | 2.6 | 1.1 |

It is readily seen that the use of the fuel anode is effective and economical in electrochemical reductions.

The following examples are illustrative of the practice of the invention and are not for the purpose of limitation:

EXAMPLE 1

An electrolytic cell of the design of FIG. 1 of the drawing is constructed of a porous carbon catalytic (palladium impregnated) anode, a porous carbon cathode, and an electrolyte of an aqueous solution of 40 g. p-nitraniline in 100 g. hydrochloric acid per liter. After hydrogen gas was introduced into and through the porous anode into the cell, the chemically reduced p-phenylenediamine was withdrawn through the porous permanent cathode and purified of its unreacted contaminants. The current density was 0.10 amp./cm.$^2$, the required voltage was 2.5 volts. A current efficiency of 90% with about 70% of conversion was obtained. When the introduction of the hydrogen gas into the anode was stopped, the required voltage to effect the chemical reduction was 4 volts, which clearly demonstrates the savings in power, efficiency and feasibility gained through the use of the present invention.

EXAMPLE 1A

The above procedure was again carried out in the cell of FIG. 2 with the inclusion of a porous asbestos diaphragm between the two electrodes. The electrolyte was introduced under slight pressure into the cathode chamber, causing the electrolyte to flow through the porous diaphragm and out of the cell from the anode chamber. It was found that 80% conversion of p-nitraniline to p-phenylenediamine was obtained.

EXAMPLE 2

Two N sulfuric acid was introduced into the cell of FIG. 1 of the drawing. Nitrobenzene was introduced into the porous graphite cathode and hydrogen gas was introduced through a porous graphite anode impregnated with particles of platinum as the catalyst. The current density was 0.05 amp./cm.$^2$ with a 35 percent yield of p-aminophenol being obtained.

EXAMPLE 3

Nitromethane was introduced into the cell of FIG. 1. The cathode was made of porous nickel and the electrolyte consisted of a 15 percent solution of sulfuric acid in alcohol. The anode was a porous graphite sheet impregnated with palladium as the catalyst. A mixture of hydrogen gas and carbon monoxide was introduced through the porous anode. The electrolysis was carried out at a temperature of 20° C. The nitromethane was reduced to methyl hydroxyl amine at the current density of 20 milliamps. per square centimeter with a voltage of 2.1 and with a 40 percent current efficiency. This example is typical of a reduction of an organic material in a non-aqueous electrolyte.

EXAMPLE 4

A solution of glucose (10 percent) containing 5 percent NaOH and 10 percent $Na_2SO_4$ is fed into the cathode compartment of the cell of FIG. 2, said cell containing a lead-mercury amalgam as the cathode and a porous graphite sheet as the anode. A diaphragm consisting of asbestos deposited on an iron screen is inserted between the cathode and the anode. A palladium catalyst is used within the pores of the anode. A mixture of hydrogen and carbon monoxide is introduced into the fuel anode. The current density is 0.29 amp./cm.$^2$ and the voltage is 1.7. The hydrogen ion produced at the anode and which tends to migrate to the cathode is swept back by the flow of electrolyte through the diaphragm. The reoxidation of the mannitol formed at the cathode is prevented by the formation of hydrogen ion from the hydrogen gas and CO fuel in the vicinity of the anode. The product of the reduction is removed from the anode compartment and is further purified to substantially pure mannitol.

EXAMPLE 5

A solution of ½ N $NaNO_3$ and ½ N NaOH is introduced into the cell of FIG. 1 of the drawing as the electrolyte solution. A porous stainless steel fuel anode included platinum and palladium as catalysts for producing hydrogen ions, and the porous graphite cathode included silver as a catalyst for the reduction reaction at said electrode. Hydrogen gas was introduced into the anode where hydrogen ions were produced. The hydrogen ions migrate to the cathode upon the passing of a D.C. current through the cell where the reduction of the $NaNO_3$ to $NaNO_2$ was effected. The $NaNO_2$ product was withdrawn from the cell through the porous cathode. The current density was maintained at about 0.03 amp./cm.$^2$ and the voltage was 1.5. The current efficiency was about 95%. When the introduction of hydrogen gas into the cell was stopped, the required voltage to effect the reduction above was 2.5 volts with a current efficiency of about 90%.

EXAMPLE 6

The cell of FIG. 1 was used for the reduction of arsenates to arsenite compounds as follows: carbon monoxide is introduced into the porous catalytic (palladium)

graphite anode. The electrolyte is an acid solution of sodium arsenate. The current density employed was 0.02 amp./cm.$^2$ and the required voltage was 1.5 volts with a current efficiency of 98% in the reduction to sodium arsenite. When the introduction of the natural gas was stopped, the required voltage for the reaction was 2.4 volts.

I claim:

1. The method of subjecting reducible compounds to electrochemical reduction comprising passing an electrolyte solution of said compound into the cathode compartment of a two-compartment cell defined by a porous diaphragm, said cell having a solid non-porous cathode in one compartment and a porous catalytic anode in the other compartment, said electrolyte solution being under sufficient pressure to pass through said porous diaphragm into the anode compartment, introducing a hydrogen ion producing fuel through said catalytic anode, said catalyst of the anode comprising a material capable of effecting hydrogen ion producing electrochemical reaction at the interface between said fuel and said electrolyte solution to form hydrogen ions, passing a direct current from the anode to the cathode, and removing the reduced compound from the anode chamber of said cell.

2. The method of claim 1, wherein the electrolyte is an aqueous solution.

3. The method of claim 1, wherein the electrolyte is a non-aqueous solution.

4. The method of claim 1, wherein the catalyst is selected from the group consisting of palladium, platinum, rhodium, and iridium.

5. The method of claim 1, wherein the fuel is hydrogen.

6. The method of claim 1, wherein the fuel is carbon monoxide and the electrolyte is in acid medium.

7. The method of claim 1, wherein the reducible compound is glucose.

References Cited in the file of this patent

UNITED STATES PATENTS

| | | |
|---|---|---|
| 2,000,815 | Berl | May 7, 1935 |
| 2,273,795 | Heise et al. | Feb. 17, 1942 |
| 2,273,796 | Heise et al. | Feb. 17, 1942 |
| 2,280,887 | Brown | Apr. 28, 1942 |
| 2,384,463 | Gunn et al. | Sept. 11, 1945 |
| 2,458,895 | Creighton et al. | Jan. 11, 1949 |

FOREIGN PATENTS

| | | |
|---|---|---|
| 303,027 | Great Britain | Oct. 24, 1929 |
| 400,787 | France | Aug. 9, 1909 |

OTHER REFERENCES

Transactions of The Electrochemical Society, volume 75, 1939, pages 147 to 166.